Nov. 25, 1958
S. BOWMAN
2,861,593
HYDRAULIC REMOTE CONTROL
Filed June 16, 1954
5 Sheets-Sheet 2
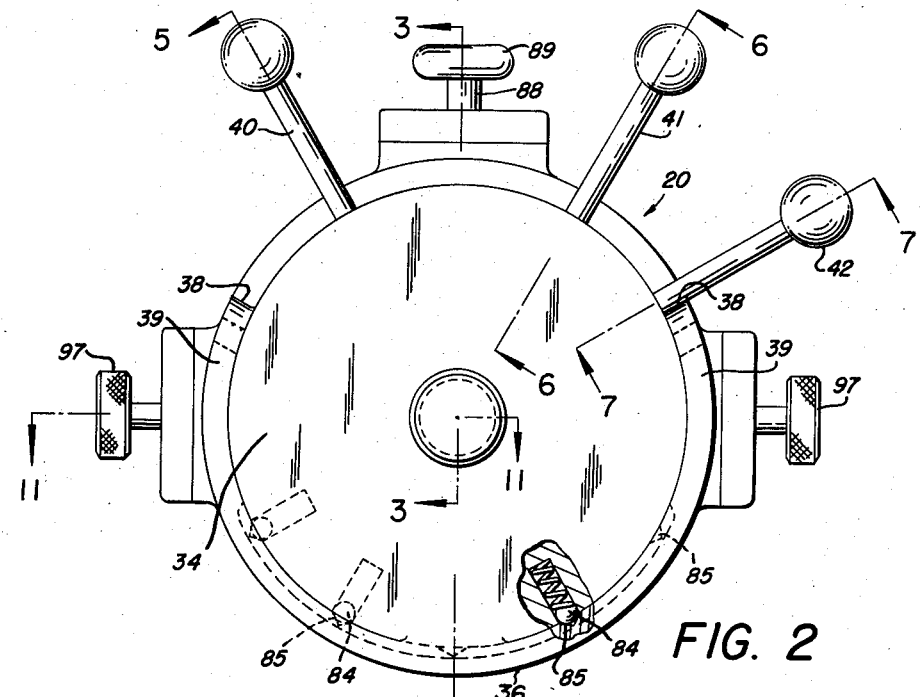
FIG. 2
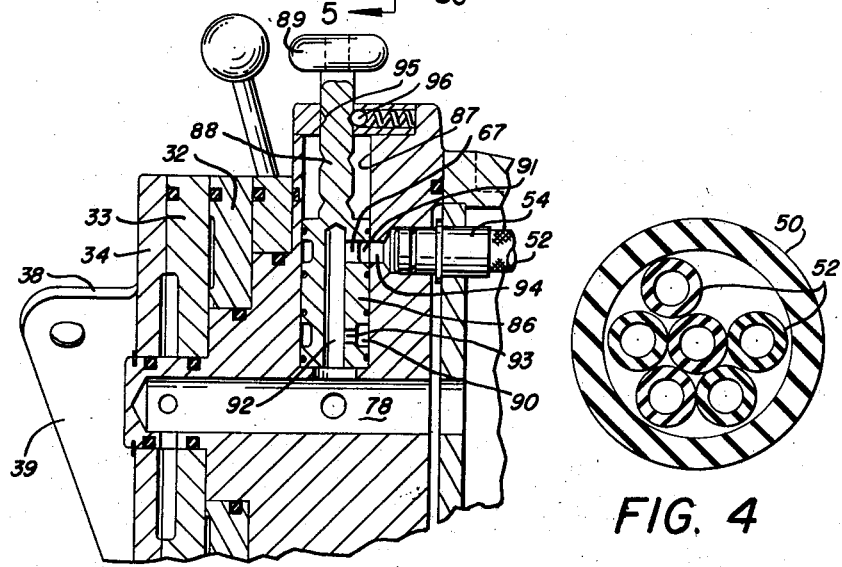
FIG. 3
FIG. 4
INVENTOR.
SPENCER BOWMAN
BY
ATTORNEY Nov. 25, 1958 S. BOWMAN 2,861,593
HYDRAULIC REMOTE CONTROL
Filed June 16, 1954 5 Sheets-Sheet 3
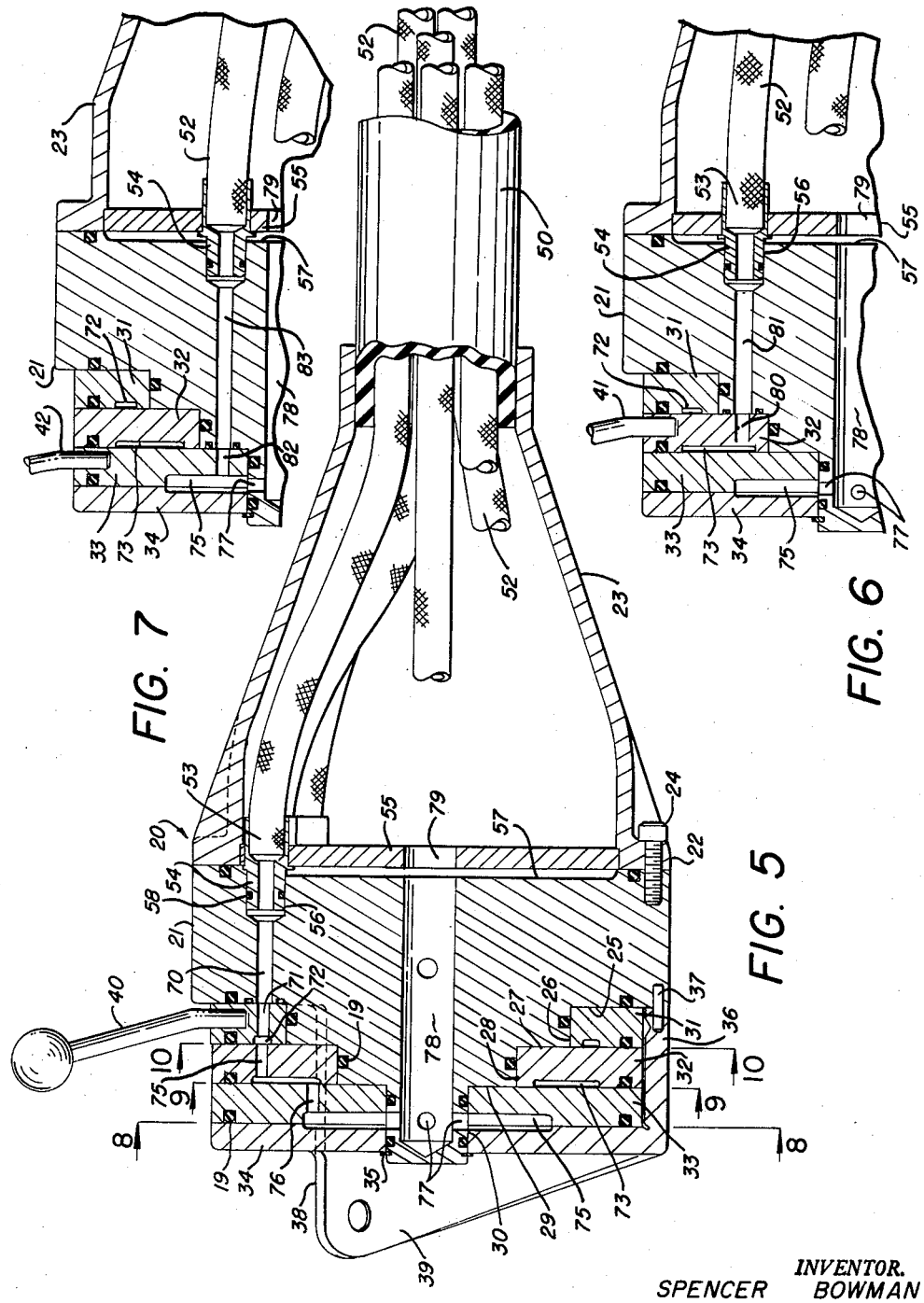
INVENTOR.
SPENCER BOWMAN
BY
ATTORNEY United States Patent Office 2,861,593
Patented Nov. 25, 1958

2,861,593
HYDRAULIC REMOTE CONTROL

Spencer Bowman, Bay Village, Ohio, assignor, by mesne assignments, to Westinghouse Air Brake Company, a corporation of Pennsylvania Application June 16, 1954, Serial No. 437,244

15 Claims. (Cl. 137—624)

This invention relates broadly to remote control for a hydraulic system, but more particularly to a control unit adapted to be carried by the operator for remotely and selectively controlling a plurality of hydraulic actuators operatively associated with component mechanisms of a self-propelled apparatus such as a continuous mining machine.

One object of this invention is to produce a remote control unit for a continuous mining machine, adapted to be carried by the operator, for selectively controlling substantially all movable components of the machine.

Another object of this invention is to provide all hydraulic actuators for such a machine with valve means hydraulically operated and controlled by a single remote control unit.

Another object of this invention is to produce such a control unit which will form a compact assembly of relatively light weight, economical of manufacture and of general superiority and serviceability.

Other objects of this invention will be apparent from the following detailed description, wherein similar characters of reference designate corresponding parts, and wherein:

Figure 2 is an enlarged end view of the valve unit as seen from the direction of the arrows 2—2 in Figure 1.

Figure 3 is a fragmental longitudinal sectional view taken on line 3—3 in Figure 2 and looking in the direction of the arrows.

Figure 4 is an enlarged cross-sectional view taken on line 4—4 in Figure 1.

Figure 5 is a longitudinal sectional view taken on line 5—5 in Figure 2 and looking in the direction of the arrows.

Figures 6 and 7 are fragmental longitudinal sectional views taken on lines 6—6 and 7—7 respectively in Figure 2.

Figure 10:
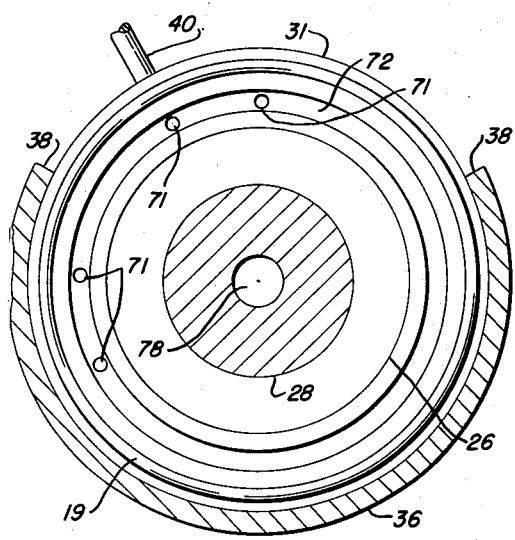
Figure 9:
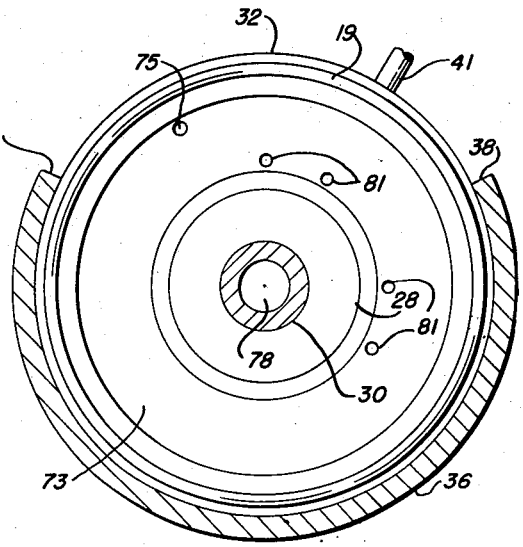
Figure 8:
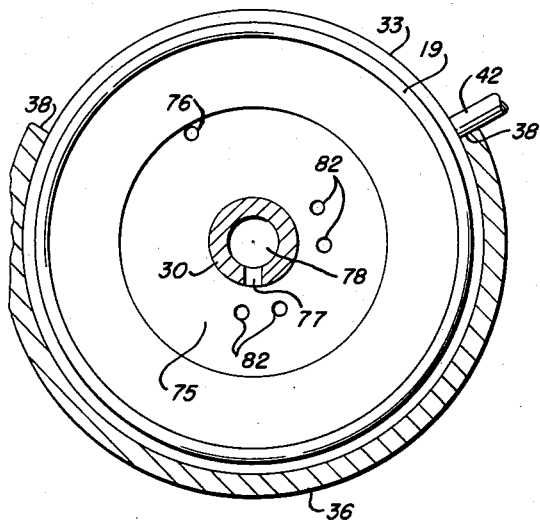

Figures 8, 9 and 10 are cross-sectional views taken on lines 8—8, 9—9 and 10—10 respectively in Figure 5 and looking in the direction of the arrows.

Figure 11:
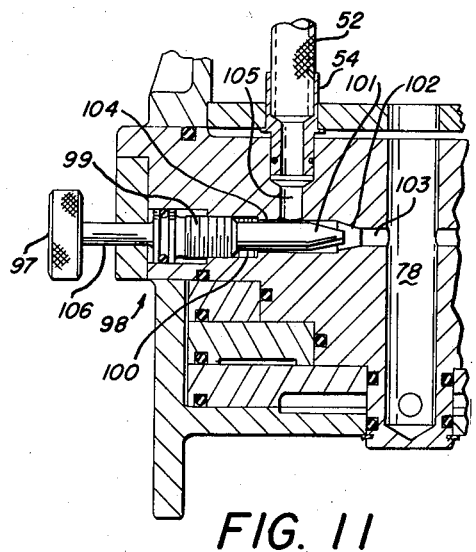
Figure 12:
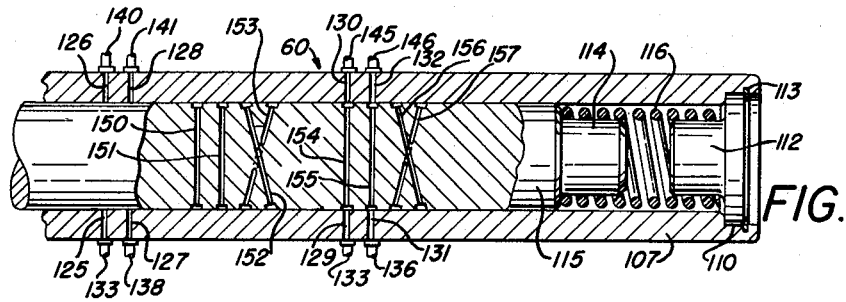

Figure 11 is a fragmental longitudinal sectional view taken on line 11—11 in Figure 2 and looking in the direction of the arrows.

Figures 12 to 15 are fragmental longitudinal sectional views, illustrating the hydraulically operated master valve in different positions.

Figure 1:
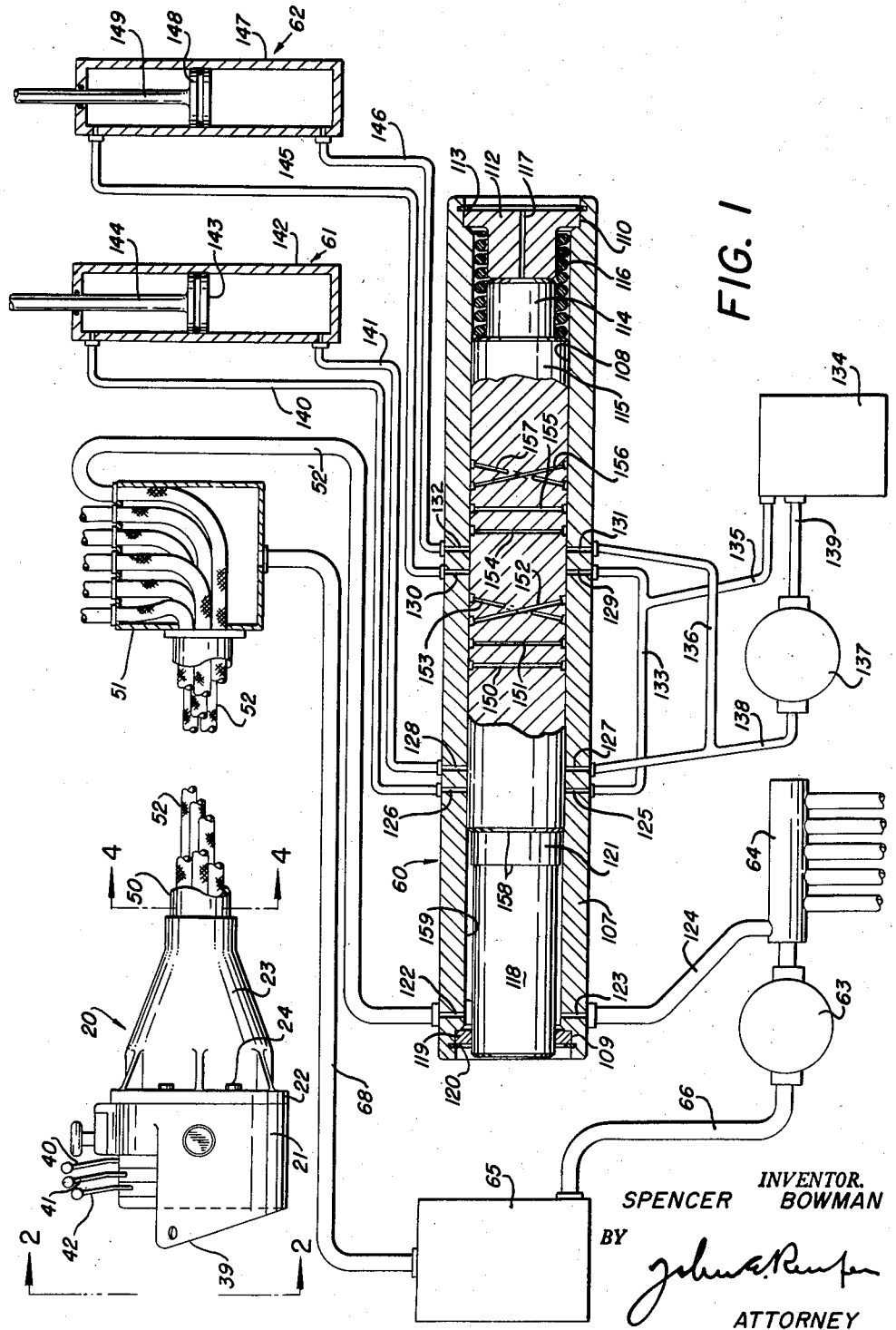
Figure 1 is a somewhat diagrammatic view of the remote control unit shown in conjunction with hydraulic actuators and the valve mechanism therefor.

Referring to the drawings, 20 designates generally the remote control unit, which comprises a housing formed of a cylindrical rear portion 21 fixed to the annular flange 22 of a front funnel shaped portion 23 by bolts 24. As clearly shown in Figures 1 and 5, within the front open end or spout of the front portion 23, is fixed and preferably cemented to form a fluid tight joint therewith one end of a relatively long tubular flexible casing or conduit 50, made of rubber or other flexible fluid tight material and having its other end attached to and opening into an outlet box 51, which box is intended to be secured to and carried by the machine with which the remote control is to be used. Within casing 50 is loosely mounted a plurality, six in this instance, of small flexible conduits 52 made of rubber or other fluid tight material, each with an inner end 53 having cemented thereon or otherwise affixed a nipple 54. These nipples are press fitted within appropriate holes extending through the inner wall 55 of the housing front portion 23, and are adapted to fit closely within sockets 56 formed within the adjacent end wall 57 of housing rear portion 21. Each nipple preferably carries a ring packing 58 to assure a fluid tight joint within its respective socket. Outside of the outlet box 51, each conduit 52 is connected directly to a fluid operated actuator or the like, or preferably, as shown in Figure 1, to the outlet side of a master valve generally designated by 60, which valve is intended to control operation of actuators such as 61 and 62 in a manner hereinafter described. Master valve 60 is connected to the outlet side of a pump 63 through a manifold 64 while the inlet side of the pump is connected to a sump tank 65 through a conduit 66. The sump tank 65 is in turn connected to the bottom of the outlet box 51 through a conduit 68, the box having return fluid conveyed thereinto from the tubular casing 50 which, as hereinafter explained, acts as a return conduit for all secondary conduits 52.

As shown in Figure 5, the rear end portion of housing 21 is provided with a first annular vertical wall on seat 25 terminated at its inner end by a cylindrical axially extending step 26 from which extends inwardly a second but smaller annular seat 27 terminated at its inner end by a cylindrical axially extending step 28. From this last step to a third but smaller cylindrical step 30 extends a third annular seat 29. All these steps are concentric with the center axis of the housing and all annular seats are perpendicular thereto and therefore parallel with one another. Fitted on the cylindrical steps 26, 28 and 30 for rotation and radial support thereon, are three disk valves 31, 32 and 33 respectively, all of a uniform external diameter and having parallel inner and outer side walls, with the inner wall of the disk 31 adapted to fit closely against seat 25, the inner wall of disk 32 against seat 27 and the outer wall of disk 31, and the inner wall of disk 33 against seat 29 and the outer wall of disk 32. These disk valves are retained against each other and their respective seats by an end plate 34 fitted on the cylindrical step 30 and retained thereon by an annular spring clip 35. To assure a fluid tight joint between the disks, their seats and cylindrical steps, they are provided the usual ring packings 19. Plate 34 has a portion of a cylindrical skirt 36 extending partway around the disk valves and fastened against rotation relative to housing near portion 21 by a dowel 37. This skirt extends peripherally over the lower portion of the disk valve, as seen in Figure 2, an extent of about 240° and its ends form two radial shoulders or stops 38. From its lowest point in Figure 2, this skirt extends gradually longitudinally backward to form two arcuated ears 39, having attached thereto the ends of a cord or the like, not shown, through which the control unit 20 may be carried by the operator. Disk valves 31, 32 and 33 have operating levers 40, 41 and 42 respectively fixed thereto by any suitable means and extending laterally thereof for possible engagement with the stops 38 for limiting the angular range within which their respective disk may be rotated. Preferably, and as clearly shown in Figure 1, these levers are bent backward to pass each other without interference and to be readily handled by the operator.

As shown in Figure 5, a duct 70 leading from one nipple 54 opens on the annular seat 25 for possible registry with one of several ports or orifices 71 extending through disk 31 and opening into an annular groove 72 formed on the outer side of the disk. As shown in Figure 10, orifices 71 are drilled on one circle, but are of different sizes and peripherally spaced or individual registry with duct 70. Annular groove 72 is in constant communication with a similar but wider groove 73 formed on the outer side of disk 32 through one duct 74, while groove 73 is also in constant communication with a similar groove 75 formed on the outer side of disk 33 through a duct 76. Groove 75 communicates, through one or more radial ports 77, with a relatively large passage 78 provided centrally within housing 21. This passage opens through the end wall 57 into the funnel-shaped portion 23 through one or more passages 79.

As shown in Figures 6 to 9, disk valve 32 is also provided with a plurality of orifices 80 drilled therethrough and opening into annular groove 73. These orifices are drilled on one circle, are of different sizes and peripherally spaced for individual registry with a duct 81 connected to another secondary conduit 52 through a nipple 54.

Similarly, the disk valve 33, as shown in Figures 7 and 8, is provided with a plurality of orifices 82 drilled therethrough and opening into annular groove 75. These orifices are drilled to one side, are of different sizes and peripherally spaced for individual registry with a duct 83 connected to another secondary conduit 52 through a nipple 54.

To assure proper registry of the disk orifices with their respective ducts leading to their secondary conduits 52, for instance, proper registry of the orifices 82 of disk 33 with duct 83, Figure 7, each disk is provided with a spring pressed detent 84, Figure 2, projecting radially from the peripheral wall thereof and adapted to fit into peripherally spaced sockets 85 formed within the inner wall of skirt 36.

Beside the three disk valves 31, 32 and 33, housing 21 has mounted therein a piston valve clearly shown in Figure 3, which includes a cylindrical valve member 86 slidable within a bore 87 closed at its upper end and through which extends a stem 88 terminated by a knob handle 89. Valve member 86 is provided with two external annular and axially spaced grooves 90 and 91 in communication with a central passage 92 through radial ports 93 and 67 respectively of different sizes, which central passage opens into the housing central passage 78. Valve grooves 90 and 91 are capable of individual registry with a short duct 94 which is connected to another secondary conduit 52 through a nipple 54. To assure proper registry of the valve grooves with duct 94, or in a third position of the valve to close duct 94, the valve stem 88 is provided with three axially spaced V-shaped grooves 95 adapted to receive a spring pressed detent 96 mounted within the closed end of bore 87.

Also mounted within housing 21, are two diametrically opposed needle valves operable by knobs 97, Figure 2, one of said valves being shown in detail in Fig. 11. Both needle valves 98 are identical, each comprising a threaded by 99 cooperating with threads of a bore 100 and having a taper ended stem 101 adapted to fit into a taper seat 102 which communicates with the housing main passage 78 through a port 103. Stem 101 is located with a bore 104 of somewhat larger diameter which is connected to another secondary conduit 52 through a duct 105 and nipple 54. Valve body has another stem 106 extending through the closed outer end of bore 100 where it has affixed thereon the knob 97.

From the foregoing description, it will be understood that housing rear portion 21 may have mounted therein any suitable type of valves, such as disk valves, plunger valves or needle valves, all readily operable by the user to control fluid flow from a plurality of secondary conduits 52 into the sump tank 65 through the main casing 50, outlet box 51 and conduit 68. Obviously, conduits 52 may be connected to any actuator, motor or the like intended to be controlled by one or more of the valves mounted within housing 21, or each extension 52' of conduit 52 may be connected to a master valve as shown in Figure 1, which illustrates a practical application of such a connection. In this instance, conduit extension 52' is connected to a master valve 60 which is shown to include a cylindrical casing 107 having a one diameter bore 108 extending therethrough and formed at both ends with counterbores 109 and 110. In the counterbore 110 is mounted the annular flange of a plug 112 which is retained therein by an annular spring clip 113. Plug 112 is smaller than bore 108 and extends a short distance thereinto to form a stop engageable by the adjacent reduced end 114 of a cylindrical valve member 115 slidable within bore 108. A compression spring 116 fitted on the plug 112 or on the reduced end 114 of valve 115 interposed therebetween and tends to shift valve 115 toward the left in Figure 1, the end of bore 108 in which this spring is mounted is vented through a small port 117. The other end of valve 115 is also formed by a reduced portion 118 slidable through an end washer 119 retained within counterbore 109 by an annular spring clip 120. At its inner end, reduced portion 118 has a step 121 calculated to engage washer 119 for limiting outward movement of the valve. This step is of a diameter smaller than that of bore 108, thereby when step engages washer 119, enabling fluid flow around step 121 from a radial port 122 constituting the end of conduit 52' to a radial port 123 constituting the inlet end of a conduit 124 leading to the manifold 64.

Intermediate its ends, valve casing 107 is provided with a pair of diametrical opposed ports 125 and 126 extending therethrough, and adjacent thereto a pair of similar ports 127 and 128. Further spaced from these two sets of ports are two other pairs including opposed ports 129 and 130 and similarly disposed ports 131 and 132. Ports 125 and 129 are interconnected by a conduit 133 which leads to a sump tank 134 through a conduit 135. Ports 127 and 131 are interconnected by a conduit 136 which leads to a pump 137 through a conduit 138, the pump being connected to the sump tank 134 through a conduit 139. Radial port 126 is connected to the upper end of actuator 61 through a conduit 140, while port 128 is connected to the lower end of the same actuator through a conduit 141. Briefly, actuator 61 comprises a cylinder 142 having a fluid actuated piston 143 slidable therein, to which is attached a piston rod 144 extending through one end of the cylinder to perform its intended work. Port 130 is connected to upper end of actuator 62 through a conduit 145, while port 132 is connected to the lower end of the same actuator through a conduit 146. Actuator 62 also comprises a cylinder 147 having a fluid actuated piston 148 slidable therein, to which is attached a piston rod 149 extending through one end of the cylinder to perform its intended work. Intermediate its ends, valve 115 is provided with eight longitudinally spaced cross ports 150 to 157 affording possible communication between the radial ports 125 to 132 in a manner hereinafter explained.

Both ends of valve step 121 define annular areas, the sum of which constitutes an effective valve actuating area 158 located within a pressure chamber 159 formed within the left end of the valve casing in Figure 1, between washer 119 and the inner end of step 121, into which chamber opens the radial ports 122 and 123.

In practice, it will be understood that any of the conduits corresponding to 52' extends from a master valve such as 60 into outlet box 51 and therefrom through main conduit 50 into funnel shaped housing 23 where its end 53 is secured to wall 55 by nipple 54, which nipple is also closely fitted within a socket 56 and has the flow of fluid therethrough adapted to be controlled by any one valve mounted within housing 21. Assuming that conduit 52' has its nipple 54 opening into duct 70 in Figure 5 to be controlled by disk valve 31, the system will operate as follows: When disk valve 31 is set with its orifices 71 out of registry with the duct 70, pressure fluid from pump 63 admitted into pressure chamber 159 through conduit 124 and port 123 will, since conduit 52' is closed by disk valve 31, be under maximum pressure to act on valve actuating area 158 for shifting and holding valve 115 in its fully retracted position against spring 116 as shown in Figure 1. In this instance, since the actuators 61 and 62 are out of connection with pump 137, they remain in the neutral or inactive position shown in Figure 1.

As the disk valve is rotated to position its smallest orifice 71 in registry with duct 70, a fraction of the pressure fluid supplied to chamber 159 from pump 63, is now free to exhaust from that chamber through conduit 52', into funnel shaped housing 23 through smallest orifice 71 and groove 72 of disk 31, duct 75 and groove 73 of disk 32, duct 76 and groove 75 of disk 33, radial ports 77 and housing main port 78. From housing 23 exhaust or return fluid is free to flow through main casing 50 into bottom of outlet box 51 and therefrom into sump tank 65 through conduit 68. In this instance, spring 116 acting on the right end of the valve against the fluid pressure in chamber 159, will cause valve to assume position shown in Figure 12. In this new position of the valve, lower end of cylinder 147 of actuator 62 is connected to pump 137 through conduits 138, 136, valve casing ports 131 and 132 interconnected by valve port 155, and conduit 146, while the upper end of cylinder 147 is free to exhaust to the sump tank 134 through conduit 145, valve casing ports 129 and 130 interconnected by valve port 154, and conduits 133 and 135, thereby causing upward movement of piston 148 to perform its intended work.

Figure 13:
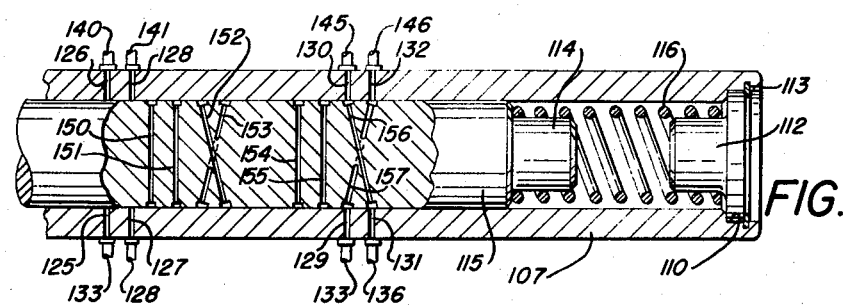

As the disk valve 31 is rotated by its lever 40 to position its next and larger orifice 71 in registry with duct 70, more pressure fluid will exhaust from chamber 159 through conduit 52' into sump tank 65 in the manner above described, thereby further reducing the fluid pressure within chamber 159 to enable spring 116 to push valve 115 to the position shown in Figure 13. In this instance, the upper end of cylinder 147 of actuator 62, is in communication with pump 137 through conduits 138 and 136, valve casing ports 130 and 131 interconnected by valve cross port 156, and conduit 145. Concurrently the lower end of cylinder 147 is connected to the sump tank 134 through conduit 146, valve casing ports 129 and 132 interconnected by valve cross port 157, conduits 133 and 135, thereby effecting downward motion of the actuator piston 148.

Figure 14:
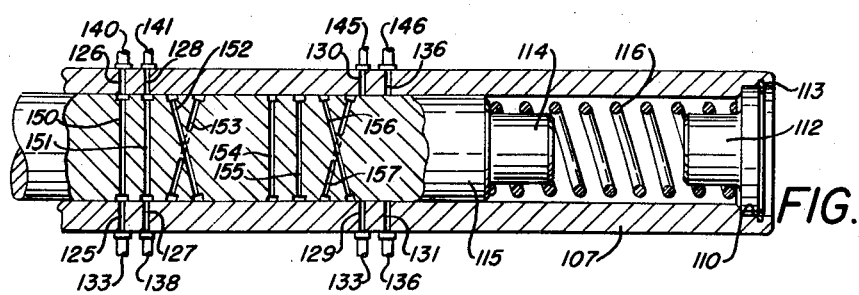
Figure 15:
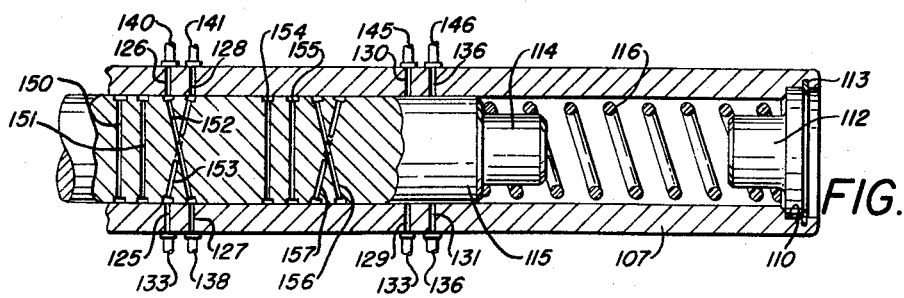

When disk 31 is rotated to position its next and larger orifice 71 in registry with duct 70, more pressure fluid will exhaust from chamber 159 into sump tank 65 in the manner above described, thereby further reducing the fluid pressure within chamber 159 to enable spring 116 to push valve 115 to the position shown in Figure 14. In this instance the lower end of cylinder 142 of actuator 61 is connected to the pump 137 through conduit 138, valve casing ports 127 and 128 interconnected by valve cross port 151, and conduit 141. Concurrently, the upper end of cylinder 142 is free to exhaust through conduit 140, valve casing ports 126 and 125 interconnected by valve cross port 150, conduits 133 and 135 into sump tank 134, thereby effecting upward movement of piston 143.

Finally, when valve disk 31 is rotated to position its next and still larger orifice 71 in registry with duct 70, more pressure fluid will exhaust from chamber 159 into sump tank 65 in the manner above described, thereby further reducing the fluid pressure within chamber 159 to enable spring 116 to move valve 115 to the position shown in Figure 14. In this instance, the upper end of cylinder 142 of actuator 61 is connected to the pump 137 through conduit 138, valve casing ports 127 and 126 interconnected by valve cross port 152 and conduit 140. Concurrently the lower end of cylinder 142 is connected to the sump tank 134 through conduit 141, valve casing ports 128 and 125 interconnected by valve cross port 153, conduits 133 and 135.

Since the shifting of the master valve 115 is responsive to the tension of the spring 116 and a variation of pressure within the pressure chamber 159, or more particularly is effected by virtue of differential opposed forces exerted thereon by said spring and fluid pressure of the valve area, it is obvious that all disk orifices corresponding to the orifices 71 of disk 31 must be accurately sized so that the exact precalculated amount of pressure remains in the pressure chamber 159 for each valve disk setting. It is also important that the spring be of an accurate rate to correctly position the master valve against the pressure within chamber 159.

While only one master valve and only one pair of actuators are shown and described, in practice it will be understood that the other two remote disk valves 32 and 33 are similarly associated with other master valves and actuators, not shown.

Since the piston valve shown in Figure 3 and the two needle valves, one of which is shown in Figure 11, are all well known, no detailed description of their operation is thought necessary, other than pointing out that with the piston valve fluid flow from duct 94 to main passage 78 may be varied through valve ports 67 and 93, the former being larger than the latter.

When used in conjunction with a continuous mining machine, the three remote disk valves are preferably used for controlling the tilt of the machine, its conveyor and the size of the seam being cut. The piston valve assembly shown in Figure 3 is preferably used for controlling the forward and backward drive of the machine, while the two needle valves shown in Figure 11 are preferably used for independent control of the left and right crawlers of the machine.

From the foregoing description, it will be understood that the remote control unit 20 is flexibly connected by the outside casing 50 and secondary conduits 52 to the machine with which it is used, thereby enabling the control unit to be carried by an operator located away from such machine. By the simple manipulation of the many valves incorporated in the control unit, the user can readily control a multiplicity of operations which he can observe without interference or obstruction from parts of the machine.

It will also be understood that the outside casing 50 which houses all secondary conduits 52 from the outlet box 51 and the control unit 20, also serves as a return passageway for all secondary conduits housed therein, that is, acts as a path of communication between control unit 20 and outlet box 51 for return flow of fluid from all secondary conduits 52.

Although the foregoing description is necessarily of a detailed character, in order to completely set forth the invention, it is to be also understood that the specific terminology is not inended to be restrictive or confining and it is to be further understood that various rearrangements of parts and modification of structural detail may be resorted to without departing from the scope or spirit of the invention as herein claimed.

I claim:

1. A remote control for a hydraulic system comprising a plurality of flexible hydraulic fluid conveying conduits leading from a fixed box to a portable control unit, each of said conduits having one end fixed within said unit, a fluid tight flexible casing surrounding said conduits between said unit and box and constituting a passage-way for return flow of hydraulic fluid from said conduit ends to said box, passages within said unit between said conduit ends and casing, and individual valve means within said unit operable for selectively controlling hydraulic fluid flow through said passages from each of said conduit ends to said casing.

2. A remote control for a hydraulic system comprising a plurality of flexible hydraulic fluid conveying conduits leading from a fixed box to a portable control unit, said unit comprising a funnel shaped housing with said conduits leading thereinto through the spout end thereof, each of said conduits having one end fixed within said unit, a fluid tight flexible casing surrounding said conduits between said unit and box and constituting a passage-way for return flow of hydraulic fluid from said conduit ends to said box, a fluid tight joint between one end of said casing and the spout end of said housing, passages within said unit between said conduit ends and said casing end, and a valve within said unit for each of said conduit ends operable for selectively controlling hydraulic fluid flow therefrom through said passages into said casing.

3. A remote control for a hydraulic system comprising a plurality of flexible hydraulic fluid conveying conduits leading from a fixed box to a portable control unit, each of said conduits having one end fixed within said unit, passages within said unit for each of said conduit ends, a flexible casing of impermeable material surrounding said conduits and constituting a passage-way for return flow of hydraulic fluid from said conduit ends to said box, a single path of communication within said unit from all of said passages to said casing, and valve means within said unit operable for selectively controlling hydraulic fluid flow through said passages from said conduit ends.

4. As a part of a hydraulic system, a plurality of hydraulic fluid conveying flexible conduits, a single portable control unit for all of said conduits including a housing having ends of said conduits entered thereinto through an open end thereof, said conduit ends being fixed within said unit, passages within said unit from said conduit ends to said housing open end, a fluid tight flexible casing surrounding said conduits outside of said housing and constituting a passage-way for flow of hydraulic fluid from all of said conduit ends, a fluid tight joint between one end of said casing and said housing open end, and valve means within said unit operable for selectively controlling hydraulic fluid flow through said passages from said conduit ends.

5. As a part of a hydraulic system, a plurality of hydraulic fluid conveying flexible conduits, a single portable control unit for all of said conduits including a housing having ends of said conduits entered thereinto through an open end thereof, said conduit ends being fixed within said unit, a casing of fluid tight flexible material surrounding said conduits and constituting a passage-way for flow of hydraulic fluid from all of said conduit ends, a fluid tight joint between one end of said casing and said housing open end, a main passageway within said unit in open communication with said casing end, passages within said unit affording communication between said conduit ends and said main passage-way, and valve means within said unit operable for selectively controlling hydraulic fluid flow through said passages from said conduit ends.

6. As a part of a hydraulic system, a plurality of hydraulic fluid conveying conduits, a single portable control unit for all of said conduits including a housing having ends of said conduits entered thereinto through an open end thereof, said conduit ends being fixed within said housing, a tubular casing of fluid tight flexible material loosely fitted over said conduits, a fluid tight joint between one end of said casing and said housing open end, a main passage-way within said housing in open communication with said casing end, passages within said housing affording communication between said conduit ends and said passage-way, and a valve within said housing for each of said conduit ends operable for controlling hydraulic fluid flow therefrom through said passages.

7. In a hydraulic system, a plurality of hydraulic fluid conveying conduits, a single portable control unit for all of said conduits, at least one relatively long portion of each conduit nearest to said unit being made of flexible fluid tight material with one end thereof fixed within said unit, a single casing of flexible fluid tight material surrounding all of said conduit portions and constituting a passage-way for flow of hydraulic fluid from all of said conduit ends, a fluid tight joint between one end of said casing and unit, passages within said unit from said conduit ends to said casing end, and valve means within said unit operable for selectively controlling hydraulic fluid flow through said passages from said conduit ends.

8. In a hydraulic system, a remote control unit comprising a housing formed with an open end, a cross wall within said housing longitudinally spaced from said open end, a plurality of first hydraulic fluid conveying flexible conduits each having one end entered into said housing through said open end and cross wall, fastening means between said conduit ends and cross wall, a second flexible conduit surrounding said first ones and adapted to carry hydraulic fluid from said housing open end, a fluid tight joint between one end of said second conduit and said housing open end, a passage-way within said housing through said cross wall affording communication between said conduit ends and said housing open end, and valve means within said housing operable for controlling hydraulic fluid flow from said conduit ends through said passage-way.

9. A control unit comprising a housing, a plurality of flat concentric annular valve seats within said housing, a disk valve rotatable on each of said seats, a fluid conveying duct opening on each of said seats, a passage-way in said housing centrally through said valves and seats, a system of passages within said valves and housing affording constant open communication of each valve with said passage-way, and at least one orifice through each valve movable upon rotation of the valve to establish or sever communication of the duct opening on its respective seat with said system of passages.

10. A control unit comprising a housing, a plurality of concentric axially spaced annular valve seats within said housing, a plurality of side by side engaged disk valves one for each of said seats in fluid tight engagement therewith, said valves being rotatable relative to one another and to their respective valve seats, a fluid conveying duct opening on each of said seats, a passage-way in said housing centrally through said valves and seats, a system of passages within said valves and housing affording constant open connection of each valve within said passage-way and a plurality of different size orifices through each valve selectively movable upon rotation of the valve into registry with the duct of its respective seat for controlling fluid flow from said duct to said passage-way through said system of passages.

11. A control unit comprising a housing, a plurality of concentric axially spaced annular valve seats on one end of said housing, a plurality of rotatable side by side engaged disk valves, one for each of said seats in fluid tight engagement therewith, a central cylindrical step projecting axially from each seat through its respective disk valve as a radial support therefor, a fluid conveying duct opening on each seat, a passage-way in said housing centrally through said valves and seats, a system of passages within said valves and housing affording constant open communication of each valve with said passage-way, an orifice through each valve movable upon rotation of the valve to establish or sever communication of the duct of its respective seat with said system of passages, and an end plate fixed on said housing maintaining said disk valves in engagement with each other and with their respective seats.

12. A control unit according to claim 11, in which each disk valve has an operating lever extending outwardly from the peripheral wall thereof, a skirt fixed to said housing partly surrounding said disk valves with radial ends angularly spaced and constituting stops engageable by said levers.

13. As a part of a hydraulic system, a plurality of hydraulic fluid conveying flexible conduits, a single portable control unit for all of said conduits including a housing having ends of said conduits entered thereinto through an open end thereof, said conduit ends being fixed within said housing, a fluid tight tubular casing surrounding said conduits outside of said housing and constituting a passage-way for flow of hydraulic fluid from said housing open end, a fluid tight joint between one end of said casing and said housing open end, a plurality of concentric axially spaced annular valve seats on the other end of said housing, a plurality of rotatable side by side engaged disk valves one for each of said seats in fluid tight engagement therewith, a central cylindrical step projecting axially from each seat through its respective disk valve as a radial support therefor, a fluid conveying duct leading from each of said seats to each of said conduit ends, a main central passage within said housing in open communication with said housing open end, a system of passages within said valves and housing affording constant open communication of each valve with said main passage, a plurality of different size orifices through each valve selectively movable upon rotation of the valve into registry with the duct of its respective seat for controlling hydraulic fluid flow from said duct to said main passage via said system of passages, and an end plate fixed on said housing maintaining said disk valves in engagement with each other and with their respective seat.

14. A remote control for a hydraulic system comprising a plurality of hydraulic fluid conveying conduits leading from a box to a control unit, each of said conduits having an end fixed within said unit, a fluid tight casing surrounding said conduits between said unit and box and constituting a passage-way for return flow of hydraulic fluid from said conduit ends to said box, passages within said unit between said conduit ends and casing, and individual valve means within said unit operable for selectively controlling hydraulic fluid flow through said passages from each of said conduit ends to said casing.

15. As a part of a hydraulic system, a control unit, a plurality of fluid conveying conduits each having an end fixed within said unit, a casing surrounding said conduits and constituting a passage-way for return flow of fluid from said conduit ends, a single duct within said unit affording a path of communication between said conduit ends and said casing, and means for selectively controlling registry of said conduit ends with said duct.

References Cited in the file of this patent

UNITED STATES PATENTS

| | | |
|---|---|---|
| 783,313 | Roberts | Feb. 21, 1905 |
| 1,020,303 | Millen | Mar. 12, 1912 |
| 1,135,917 | Partington | Apr. 13, 1915 |
| 1,590,578 | Harris | June 29, 1926 |
| 1,642,623 | Niven | Sept. 13, 1927 |
| 1,995,052 | Bodenlos | Mar. 19, 1935 |
| 2,074,618 | Roeder | Mar. 23, 1937 |
| 2,318,236 | Layton | May 4, 1943 |
| 2,344,913 | Ager | Mar. 21, 1944 |
| 2,370,526 | Doran | Feb. 27, 1945 |
| 2,374,588 | Doran | Apr. 24, 1945 |
| 2,374,714 | Turchan | May 1, 1945 |
| 2,531,802 | Boyer | Nov. 28, 1950 |
| 2,679,862 | Gorrie | June 1, 1954 |

FOREIGN PATENTS

| | | |
|---|---|---|
| 488,489 | Great Britain | July 4, 1938 |